Oct. 7, 1958 C. H. O. BERG 2,854,927
HIGH SPEED SHAFT BEARING AND SEAL ASSEMBLY
Filed March 26, 1956
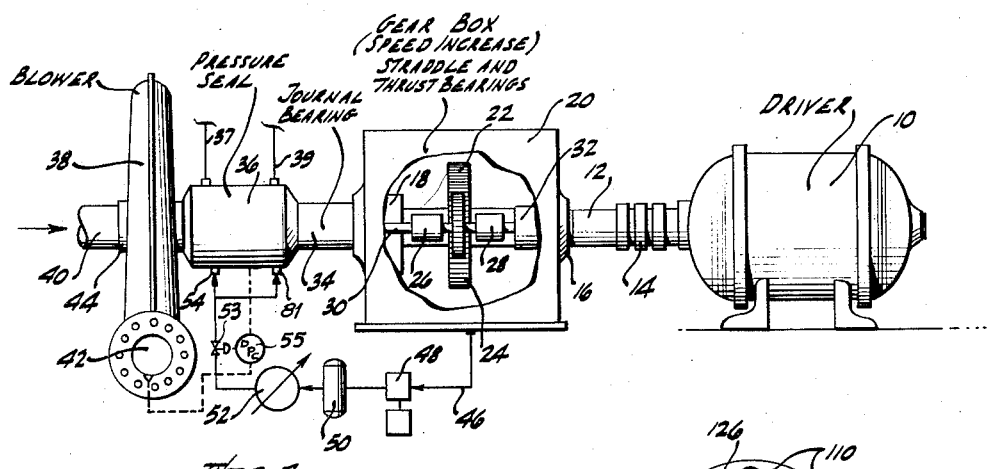
INVENTOR.
CLYDE H. O. BERG,
BY
ATTORNEY.

United States Patent Office 2,854,927
Patented Oct. 7, 1958

2,854,927

HIGH SPEED SHAFT BEARING AND SEAL ASSEMBLY

Clyde H. O. Berg, Long Beach, Calif., assignor to Union Oil Company of California, Los Angeles, Calif., a corporation of California Application March 26, 1956, Serial No. 573,685

12 Claims. (Cl. 103—111)

This invention relates to improved pressure seals and bearings for rotating shafts and particularly relates to an improved rotary pressure seal for modern high speed blower and pump shafts, and the like.

The transfer of rotational energy through a barrier separating a high pressure from a low pressure system is of considerable importance in such operations as the agitation of fluids within pressure vessels, the operation of high pressure turbines, high pressure pumps and blowers, and other such operations. The rotating shaft under all conditions must be provided with adequate bearings to maintain the shaft in proper alignment as well as to take up thrust forces frequently involved in such mechanical energy transfer. In many cases the element attached to the driven end of the shaft, that is, the loaded end, operates under high pressure or high temperature or in media which are corrosive or contain abrasive particles or other materials which are highly dangerous to bearings along the length of the shaft. Under such conditions a highly effective seal is required to prevent corrosion or abrasion or misalignment of the bearings or other rotating elements due to leakage of high pressure corrosive or abrasive fluids into the shaft seal and bearing housing.

Special problems arise in cases involving modern high head blowers and pumps in which very high rotational speeds often in excess of 10,000 R. P. M. are used. The usual stuffing box and packing type of pressure seal is totally inadequate. Serious shaft erosion is caused by the packing when it is tightened sufficiently to prevent leakage. If the blower or pump is used in a corrosive service or in moving fluids containing fine solids or dust, any leakage whatsoever along the shaft causes corrosion or erosion. Highly efficient rotating seals are required using O rings and spring-loaded seal pieces.

Even with such rotating seals other problems arise when excessively high rotational speeds are used, such as speeds of the order of 20,000 R. P. M. and higher. Centrifugal forces on the seal elements themselves grow at these speeds to such a magnitude that even they are subject to deformation and often the seal will open in spite of the spring loading. The enclosure around the springs, which are spaced around the shaft in positions which are parallel to the rotational axis of the shaft, is sufficiently far from this axis that a pressure gradient is generated in any liquid such as lubricating oil which may be present in the enclosure and its surrounding chamber. In this respect the rotating seal may generate pressure differentials sufficient to counteract the spring load. In the case of O ring seals these centrifugal forces may often deflect the O ring sufficiently in its seat so as to open the seal.

The present invention therefore is directed to an improved rotating seal and bearing assembly for these high speed shafts and which is capable of successful operation at speeds in excess of 20,000 R. P. M. without the adverse centrifugal effects referred to above.

It is therefore a primary object of this invention to provide an improved high speed seal for rotating shafts.

It is a more specific object to provide an improved bearing and seal assembly for rotating shafts operating in excess of 20,000 R. P. M. and in which the adverse pumping effects caused by centrifugal forces are eliminated and in which centrifugal effects on O rings and similar seals cause the seal to become tighter rather than to open.

Other objects and advantages of this invention will become apparent to those skilled in the art as the description and illustration thereof proceed.

The present invention will be more readily understood by reference to the accompanying drawings in which:

Figure 1 is a highly schematic side elevation view in partial cross section of a high speed blower, pressure seal, gear and bearing assembly, and a driving means in which the improved pressure seal and bearings of this invention are employed, Figure 2 is a detail view in cross section of the high pressure seal utilized immediately adjacent the loaded or driven end of the rotating shaft, and Figure 3 is an end view of the adjacent faces of rotating seal retainer pieces.

Referring now particularly to Figure 1, the apparatus in which the present invention is employed includes an electric driving motor 10, a low speed shaft 12 coupled thereto by means of coupling 14 and provided with journal bearings 16 and 18 in gear box 20. These electric motors commonly turn at speeds of the order of 3450 R. P. M. Within gear box 20 is located bull gear 22 integrally attached to the driving end of low speed shaft 12. Also disposed within gear box 20 is spur gear 24 disposed between straddle bearings 26 and 28 and comprises an integral part of high speed shaft 30. Journal bearings 32, located within gear box 20, and 34 serves to maintain the high speed shaft 30 in alignment. The tooth ratio between bull and spur gears 22 and 24 is such that the high speed shaft turns at a speed approximating 21,000 R. P. M. This requires a tooth ratio of about 6 to 1.

High speed shaft 30 continues through journal bearing 34 and pressure seal 36, having coolant inlet and outlet 37 and 39, to blower 38. Gases are supplied to the blower through inlet 40 and discharged through outlet 42 at a considerably higher pressure. An outboard bearing 44 is provided at the extreme end of the high speed shaft.

Gear box 20 is filled or partially filled with gear lubricant which is circulated through line 46 by means of pump 48. It is passed through oil cleaner 50 and oil cooler 52 and is introduced through valve 53 and inlets 54 and 81 into pressure seal 36. The pressure at which the lubricant is introduced through inlets 54 and 81 is preferably equal to or slightly greater than the output pressure of blower 38 by means of differential pressure controller 55 and valve 53. The lubricant returns to gear box 20 through the pressure seal 36, along the high speed shaft in journal bearing 34 and re-enters the gear box for recirculation. It simultaneously lubricates and helps cool the moving parts.

Referring now particularly to Figure 2, a detail cross section view of the essential parts of the pressure seal 36 according to this invention is shown. High speed shaft 30 provided with shoulder 56 extends from the right or driven end to the left or load end in the drawing. The pressure seal case 58 provided with coolant jacket 60 is shown. In Figure 2 the apparatus is symmetrical about the axis of shaft rotation 62 and accordingly mechanical elements shown in the bottom part of the drawing are identical to those which normally would appear at the corresponding position on the opposite side of axis 62. In the upper part of Figure 2 all stationary seal and enclosure elements have been eliminated for the sake of clarity, and only the rotating elements of the pressure seal are detailed in this part of the drawing.

The seal case 58 enclosing high speed shaft 30 provides seal chamber 64 within which the various elements of the pressure seal are enclosed. Immediately adjacent the loaded end of the shaft is a stationary oil seal assembly consisting of an L-shaped cup 66 integrally attached on the inside of seal case 58. Enclosed therein is U-shaped packing 68 and packing expander 70. Spring 72 forces expander 70 into packing 68 and because of the U-shaped cross section of the packing, the flanges of the packing are forced against L-shaped cup 66 and L-shaped retainer and seal piece holder 74. Stationary seal piece 76 is integrally attached to the seal piece holder 74.

Toward the driven end of shaft 30 and within pressure seal case 58 is disposed another stationary double-faced seal piece 78 provided with a lubricant channel 80 opening therethrough from inlet 81 into groove 82 between the adjacent pieces 84 and 86 of this seal piece. Seal piece holder 86 provided with outer O ring seals 88 and 90 against case 58 and enter O ring seal 92 against seal piece 78 are provided in seal piece retainer 86. Lubricant channel 80 continues from inlet 81 through adjustment element 94 which serves to maintain seal piece holder 86 in a stationary position.

All of the elements referred to in Figure 2 to this point are stationary. Disposed between the inner and outer stationary seal pieces 78 and 76 respectively are disposed the rotating seal elements which are firmly attached to and turn with high speed shaft 30. These elements, subsequently described, are shown in the lower part of Figure 2 between stationary seal pieces 76 and 78 and are also detailed alone in the upper part of Figure 2 to which particular reference is made.

The rotating seal elements according to this invention consist of an inner rotating seal retainer piece 100 and outer rotating seal retainer piece 102. These retainer pices are roughly of L-shaped cross section and disposed around shaft 30. Integrally attached, as by silver soldering, to inner rotating retainer piece 100 is inner rotating seal piece 104. Correspondingly attached to the opposite end of outer rotating seal retainer piece 102 is outer seal piece 106. As indicated in the lower part of Figure 2 these rotating seal pieces 104 and 106 rotate against stationary seal pieces 76 and 78 respectively. Loading springs 108 are in compression and force the rotating seal retainer pieces 100 and 102 apart so as to maintain a positive pressure between the stationary and rotating seal pieces. These loading springs are disposed in holes 110 and 112 drilled in the adjacent parallel surfaces of seal retainer pieces 100 and 102. Eight of these springs are disposed around the periphery of the rotating seal at 45° intervals as shown in Figure 3.

Inner seal retainer piece 100 is machined to a pressed fit around shoulder 56 on shaft 30 and inner O ring seal 114 is provided in inner groove 116. A second O ring seal 118 is provided between the adjacent arms of the L-shaped retainer pieces 100 and 102 in groove 120. The position of groove 120 is important. It must be machined so as to leave an inner flange 122 adjacent the end of inner seal retainer piece 100 so as to enclose O ring seal 118 on three sides. In this way the centrifugal force acting on O ring seal 118 forces it to deform outwardly against the inner surface of outer seal retainer piece 102. Because the fluid present in seal chamber 64, indicated at the bottom of Figure 2, is at a high pressure and since the fluid present immediately adjacent shaft 30 toward the driven end thereof is at a low pressure, the pressure gradient of the lubricant and the centrifugal force acting on O ring seal 118 cause it to move outwardly from the axis of rotation 62 and to the right toward the driven or low pressure end of the shaft thereby effecting and maintaining at all times a positive seal of the clearance space between the inner and outer rotating seal retainer pieces. This clearance is indicated in the upper part of Figure 2 by number 124.

Thus the lubricant pressure and the centrifugal forces which previously adversely affected the operation of high speed rotating seals now cooporate to prevent opening of the seal and actually provide an increased tendency for positive sealing as the rotational speed is increased.

In the space between adjacent faces of the rotating seal retainer pieces 100 and 102 and including the holes 110 and 112 in which the compression springs are disposed is contained a body of lubricant which turns with the seal retainer pieecs and it has a tendency to be thrown outwardly by centrifugal forces into the outer portion of seal chamber 64. In the past these forces have generated pressure gradients which are opposed to the pressure gradient and the centrifugal forces which maintain O ring seal 118 in the desired position described above. In the present invention, four longitudinal vents 126 are provided in the outer flange portion of inner seal retainer piece 100 90° apart from each other thereby venting or providing a suction inlet for lubricant into the fluid-containing space between the rotating seal retainer pieces. These vents are also extremely important in that they prevent the build-up of hydraulic pressure gradients in the space between the rotating seal retainer pieces which previously tended to open the outer O ring seal 118 disposed between the seal retainer pieces 100 and 102.

Also extending between the adjacent faces of the rotating seal retainer pieces are four connecting pins 129 also spaced 90° apart which keep the corresponding spring holes 110 and 112 in alignment and force these pieces to rotate together. These are not shown in Figure 2.

With vents 126 in the positions shown and with the inner rotating seal retainer piece 100 provided with radial flange 122 beside the outer O ring seal, the rotating seal of this invention has been made completely free of the adverse centrifugal force effects which previously rendered rotating seals inoperable at high speeds and effectively utilizes these same centrifugal forces to maintain a positive seal between the rotating seal retainer pieces.

In Figure 3, the eight spring holes 110, the four connecting pins 129, and the four vents 126 and their angular relation in the inner rotating seal retainer piece are shown more clearly.

As an example of the present invention applied to a high speed blower utilized in a dusty atmosphere, the following data are given: The blower impeller was turned at a speed of 21,000 R. P. M. in recirculating flue gas at about 720° F. in a catalyst regenerator. The flue gas contained some catalyst dust and is thus extremely erosive to rotating elements. The blower circulated 1612 MSCF per day (1000 standard cubic feet) of flue gas at a head of 35 p. s. i. and suction pressure of about 400 p. s. i. g. The lubricant was supplied to the pressure seal chamber inlet at 500 p. s. i. and the gear box was maintained at atmospheric pressure. The rotating shaft was 1.250 inches in diameter at the shoulders and the rotating seal retainer pieces maintained the rotating seal piece faces 1.162 inches apart. The extreme diameter of the inner rotating seal retainer piece was 2.363 inches. The extreme outside diameter of the outer rotating seal retainer piece was 2.283 inches. The rotating seal pieces were stellite rings silver soldered to the outside pieces of the rotating seal retainer pieces. The stationary seal pieces were barium metal, a commercially available alloy of copper and lead. This material is preferred although carbon or graphite may be substituted. As indicated in Figure 3, the loading springs were disposed 45° apart between the rotating seal pieces. Also disposed between these same retainer pieces and 90° apart from one another were four connecting pins disposed in corresponding holes drilled in the opposing faces of the rotating seal retainer pieces. The four vent holes in the inner seal retainer piece were disposed 90° apart from one another and were 0.200 inch in diameter. The eight loading springs, the four connecting pins, and the four vent holes were all located on a 1.969 inches diameter bolt circle in the inner rotating seal retainer piece and were evenly spaced apart from one another at 22.5° intervals.

This rotating seal was operated in dusty flue gas service at rotational speeds of 21,000 R. P. M. for prolonged periods of many months without discernable signs of difficulty. Previously when the inner seal retainer piece was not provided with the vent holes in the outer flange nor with the inner flange to hold the outer O ring seal, low speed operation below about 7500 R. P. M. was satisfactory but a full operating speed at 21,000 R. P. M. the seals opened and were rapidly destroyed.

Although the present invention has been described in connection with a gas blower, it should be understood that the pressure seal and bearing assembly of the present invention is applicable to any rotating shaft turning at speeds of the order of 20,000 R. P. M. or higher and in which an efficient pressure seal is required. Accordingly the present invention is contemplated for use with any rotating shaft operating at such speeds regardless of the nature of the driving or driven elements.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A pressure sealed rotary speed increasing unit which comprises a low speed rotatable shaft adapted to be connected at one end to a prime mover, a bull gear attached at the other end of said low speed shaft, a spur gear engaged with said bull gear, a high speed shaft connected at one end to said spur gear and adapted to be connected at its other end to a high speed load, a pressure seal case surrounding said high speed shaft providing an annular seal chamber therebetween, a gear box surrounding said bull and spur gears, means for pumping a lubricant from said gear box into said pressure seal case wherefrom it returns along said high speed shaft to said gear box, a pair of spaced apart stationary seal retainers integrally attached to the inner wall of said pressure seal case and disposed within said pressure seal chamber around said high speed shaft, a ring-shaped stationary seal piece attached to each seal retainer, an inner rotating seal retainer of generally L-shaped cross section integrally attached to said high speed shaft, an inner rotating seal piece attached to said seal retainer and aligned in contact with one of said stationary seal pieces, an outer rotating seal retainer of generally L-shaped cross section overlapping said inner seal retainer, an outer rotating seal piece attached to said last named retainer piece and aligned in contact with the other stationary seal piece, a plurality of loading springs disposed around and parallel to said high speed shaft between the rotating seal retainers, said inner rotating seal retainer having a plurality of openings parallel to said shaft and extending through its outer flange and an O ring seal groove and an inner flange adjacent its other end enclosed by said outer seal retainer piece, and an O ring seal disposed in said groove adjacent said inner flange and between said rotating seal retainers.

2. An apparatus according to claim 1 in combination with means for cleaning and means for cooling said lubricant connected between said means for pumping said lubricant and said seal chamber.

3. An apparatus according to claim 1 wherein said bull and spur gears have tooth ratios sufficient to turn said high speed shaft at speeds in excess of 10,000 R. P. M.

4. An apparatus according to claim 3 wherein said low speed shaft is adapted to be driven at a nominal speed of about 3450 R. P. M. and said tooth ratio is sufficient to turn said high speed shaft at about 21,000 R. P. M.

5. An apparatus according to claim 1 wherein said high speed load is maintained at a high pressure, in combination with means for controlling said lubricant pressure in said pressure seal chamber at a value approximating that of said high pressure.

6. An improved rotating pressure seal for high speed rotary shafts which comprises a rotary shaft, a pressure seal case surrounding a portion of said shaft, at least one inlet for lubricant opening into said case, a pair of spaced apart stationary seal retainers integrally attached to said pressure seal case around said high speed shaft, a ring-shaped stationary seal piece attached to each retainer, an inner rotating seal retainer of generally L-shaped cross section integrally attached to said high speed shaft, an inner rotating seal piece attached to said seal retainer and aligned in contact with one of said stationary seal pieces, an outer rotating seal retainer of generally L-shaped cross section overlapping said inner seal retainer, an outer rotating seal piece attached to said last named retainer piece and aligned in contact with the other stationary seal piece, a plurality of loading springs disposed around and parallel to said high speed shaft between the rotating seal retainers, said inner rotating seal retainer having a plurality of openings parallel to said shaft and extending through its outer flange and an O ring seal groove and an inner flange adjacent its other end enclosed by said outer seal retainer piece, and an O ring seal disposed in said groove adjacent said inner flange and between said rotating seal retainers.

7. A seal according to claim 6 in combination with a plurality of connecting pins extending between adjacent faces of said rotating seal retainers on substantially the same diameter circle as are said openings in said inner seal retainer.

8. An apparatus according to claim 7 wherein eight of said compression springs, four of said connecting pins, and four of said openings are employed in said rotating seal retainers uniformly spaced in a circle around said retainers and separated from each other by 22.5°.

9. An apparatus according to claim 8 wherein said inner rotating seal retainer is attached to said high speed shaft by a pressed fit, the inner surface of said retainer being provided with an O ring groove, and an O ring seal between said shaft and said inner surface in said groove.

10. An apparatus according to claim 6 wherein said pressure seal chamber is provided with a cooling jacket, in combination with means for passing a coolant therethrough.

11. An apparatus according to claim 6 wherein one of said stationary seal pieces is provided with a pair of concentric seal faces, said seal retainer attached thereto being provided with a lubricant channel therethrough opening into a lubricant channel through said seal piece to a point between said faces and connected in lubricant receiving relation to a source of lubricant under pressure.

12. An apparatus according to claim 6 wherein said rotating seal pieces are stellite, and said stationary seal pieces are a relatively soft, tough alloy of lead and copper.

References Cited in the file of this patent

UNITED STATES PATENTS

| | | |
|---|---|---|
| 2,393,808 | Ponomareff | Jan. 29, 1946 |
| 2,695,157 | Cone | Nov. 9, 1954 |
| 2,744,774 | Wist | May 8, 1956 |